United States Patent [19]

Papendorf et al.

[11] Patent Number: 5,542,683
[45] Date of Patent: Aug. 6, 1996

[54] CYLINDER HEAD GASKET WITH FOLDED U-SHAPED STOPPER

[75] Inventors: Jörg Papendorf, Odenthal-Glöbusch; Franz-Josef Wagner, Leverkusen, both of Germany

[73] Assignee: Goetze Payen GmbH, Herdorf, Germany

[21] Appl. No.: 500,625

[22] Filed: Jul. 11, 1995

[30] Foreign Application Priority Data

Jul. 27, 1994 [DE] Germany ............ 44 26 508.5

[51] Int. Cl.$^6$ ........................... F16J 15/08
[52] U.S. Cl. .................... 277/180; 277/235 B
[58] Field of Search .................. 277/180, 235 B, 277/236

[56] References Cited

U.S. PATENT DOCUMENTS

| | | | |
|---|---|---|---|
| 4,605,236 | 8/1986 | Tsuchihashi et al. | 277/235 B |
| 4,781,389 | 11/1988 | Beyer et al. | 277/235 B |
| 5,209,504 | 5/1993 | Udagawa et al. | 277/235 B |
| 5,364,109 | 11/1994 | Sihon | 277/235 B |

FOREIGN PATENT DOCUMENTS

| | | | |
|---|---|---|---|
| 0306766 | 3/1989 | European Pat. Off. | |
| 333920 | 9/1989 | European Pat. Off. | 277/235 B |
| 1822333 | 12/1959 | Germany . | |
| 194810 | 8/1971 | Germany | 277/235 B |
| 4308726 | 12/1993 | Germany . | |
| 4219709 | 2/1994 | Germany . | |

*Primary Examiner*—Scott W. Cummings
*Attorney, Agent, or Firm*—Spencer & Frank

[57] ABSTRACT

A cylinder head gasket includes first and second opposite sheet metal cover plates; a combustion chamber opening being formed by aligned apertures in the cover plates; and first and second beads provided in the first and second cover plates, respectively. Each bead has a convex side; the convex sides of the first and second beads are oriented toward one another. The first and second beads are in an orthogonal alignment with one another and surround the combustion chamber opening. The cylinder head gasket further has a spacer plate positioned between the first and second cover plates and is contacted by the convex side of the first and second beads. The spacer plate has an aperture which is in general alignment with the apertures in the cover plates and is defined by an edge face of the spacer plate. There is further provided a separate annular insert positioned in the aperture of the spacer plate. The annular insert is folded to form a circumferential base part and superposed, contacting circumferential leg portions interconnected by the base part and oriented radially outwardly and terminating, at outer ends thereof, at the edge face of the spacer plate.

3 Claims, 1 Drawing Sheet

CYLINDER HEAD GASKET WITH FOLDED U-SHAPED STOPPER

CROSS REFERENCE TO RELATED APPLICATION

This application claims the priority of German Application No. P 44 26 508.5 filed Jul. 27, 1994, which is incorporated herein by reference.

BACKGROUND OF THE INVENTION

This invention relates to a cylinder head gasket made of metal and intended for use in internal combustion engines. The cylinder head gasket is composed of two opposite sheet metal cover plates each having at least one bead surrounding a combustion chamber opening in the gasket and a spacer plate disposed between the cover plates. The beads are orthogonally aligned, that is, arranged in alignment with a vertical plane (related to the normal positioning of the gasket in use). The protuberant (convex) side of the bead engages the spacer plate and between the cover plates a crimped zone extends which functions as pressure limiter for the beads.

A cylinder head gasket of the above-outlined type is disclosed, for example, in European Patent No. 0 306 766. Between the two cover plates a spacer plate extends which is folded or crimped along the combustion chamber openings. By virtue of such a thickness increase, a high pressure at the combustion chamber is made possible without running the risk that the beads will be flattened by the pressure.

Dependent on the construction of the cylinder head gasket, the required installation thickness—which may be adjusted by means of the spacer plate—can be relatively large. In such a case, however, the problem is encountered that the folded terminal zone of the spacer plate results in an excessively high axial height of the cylinder head gasket.

To avoid the above-noted problem, it has been known to use separate annular inserts. Such a solution is disclosed in German Offenlegungsschrift 42 19 709, according to which the annular inserts are crimped along their edge zone and lie with their terminal region on the spacer plate. Based on the thickness of the spacer plate, the annular inserts have only a relatively small material thickness. Such annular inserts are of such a reduced thickness that they may be considered as foils. The handling of such foils, however, involves significant problems in the automatic manufacture.

SUMMARY OF THE INVENTION

It is an object of the invention to provide an improved cylinder head gasket of the above-outlined type which is ameliorated in regard to the manufacturing process and which has a better adaptability and return (spring-back) resilience for the cylinder head gasket in the region of the crimped parts.

This object and others to become apparent as the specification progresses, are accomplished by the invention, according to which, briefly stated, the cylinder head gasket includes first and second opposite sheet metal cover plates; a combustion chamber opening being formed by aligned apertures in the cover plates; and first and second beads provided in the first and second cover plates, respectively. Each bead has a convex side; the convex sides of the first and second beads are oriented toward one another. The first and second beads are in an orthogonal alignment with one another and surround the combustion chamber opening. The cylinder head gasket further has a spacer plate positioned between the first and second cover plates and is contacted by the convex side of the first and second beads. The spacer plate has an aperture which is in general alignment with the apertures in the cover plates and is defined by an edge face of the spacer plate. There is further provided a separate annular insert positioned in the aperture of the spacer plate. The annular insert is folded to form a circumferential base part and superposed, contacting circumferential leg portions interconnected by the base part and oriented radially outwardly and terminating, at outer ends thereof, at the edge face of the spacer plate.

In this manner, an annular insert having a relatively large material thickness is obtained. To effect a pressure limitation, it is sufficient if the annular insert has a material thickness only slightly larger than one half of the material thickness of the spacer plate. In this manner, the annular insert is easier to handle as compared to the prior art foils while, at the same time, the total height of the cylinder head gasket is not changed.

Furthermore, the annular insert generates on the cover plate a larger resilient spring-back force than annular inserts having only a small material thickness. In this manner, there is obtained a better adaptability of the cylinder head gasket to the components to be sealed if these increase or reduce the sealing gap because of oscillations caused by the fluctuating inner pressure or temperature fluctuations.

DESCRIPTION OF THE PREFERRED EMBODIMENT

Figure 1:
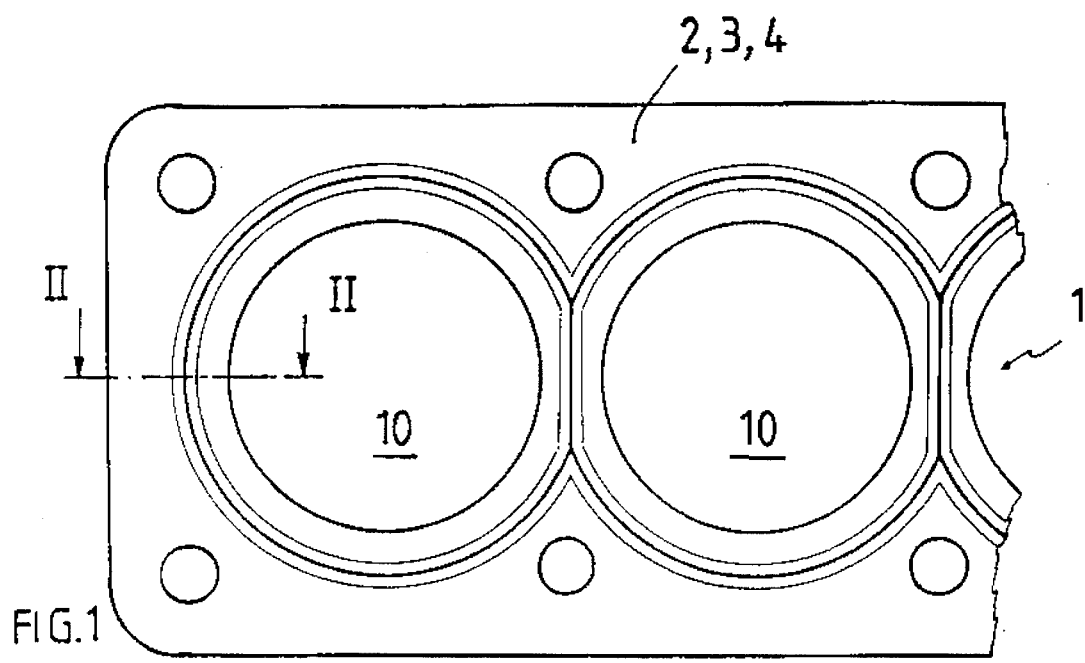
FIG. 1 is a top plan view of a cylinder head gasket incorporating the invention.
Figure 2:
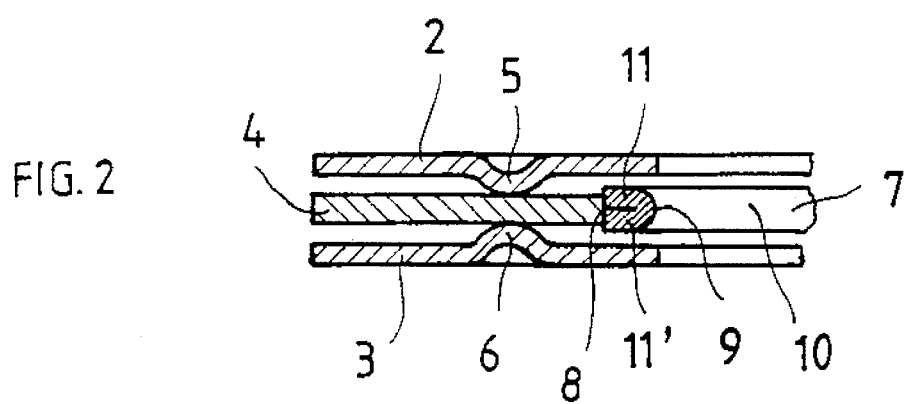
FIG. 2 is a sectional view taken along line II—II of FIG. 1.

The metal cylinder head gasket 1 illustrated in FIGS. 1 and 2 is essentially composed of two spring steel sheets 2 and 3 functioning as cover plates, as well as a spacer plate 4. The cover plates 2 and 3 each have a bead 5, 6, respectively, which are orthogonally aligned, that is, they lie in a common vertical plane and their respective convex sides engage opposite faces of the spacer plate 4. The beads 5 and 6 are in engagement with respective opposite faces of the spacer plate 4. In order to ensure that the beads 5 and 6 are not pressed flat in the installed state, an annular insert 7 is provided which extends along the spacer plate edge face 8 bounding a combustion chamber opening 10 formed of aligned apertures provided in the plates 2, 3 and 4. The annular insert 7 is of a deformable material and is made by crimping. The folded-over circumferential region or base 9 of the annular insert 7 is oriented towards the combustion chamber opening 10 of the cylinder head gasket. The circumferentially extending legs 11, 11' of the annular insert 7 are folded directly onto one another. By virtue of such a construction, the annular insert 7 is capable of generating, during operation of the internal combustion engine, a resetting force on the cover plates 2 and 3.

It will be understood that the above description of the present invention is susceptible to various modifications, changes and adaptations, and the same are intended to be comprehended within the meaning and range of equivalents of the appended claims.

What is claimed is:

1. A cylinder head gasket comprising (a) first and second opposite sheet metal cover plates;

(b) a combustion chamber opening being formed by aligned apertures in said cover plates;

(c) first and second beads provided in said first and second cover plates, respectively; each bead having a convex side; the convex sides of said first and second beads being oriented toward one another; said first and second beads being in an orthogonal alignment with one another and surrounding said combustion chamber opening;

(d) a spacer plate positioned between said first and second cover plates and being contacted by the convex side of said first and second beads; said spacer plate having an aperture being in general alignment with the apertures in the cover plates and being defined by an edge face of said spacer plate; and (e) a separate annular insert positioned in said aperture of said spacer plate; said annular insert being folded to form a circumferential base part and superposed, contacting circumferential leg portions interconnected by said base part and oriented radially outwardly and terminating, at outer ends thereof, at said edge face of said spacer plate.

2. The cylinder head gasket as defined in claim 1, wherein said base part is oriented toward and directly borders said combustion chamber opening.

3. The cylinder head gasket as defined in claim 1, wherein said annular insert has a thickness greater than that of said spacer plate.

* * * * *